(12) United States Patent
Xie

(10) Patent No.: US 6,875,538 B2
(45) Date of Patent: Apr. 5, 2005

(54) ELECTRODE, METHOD OF PRODUCING THE SAME, AND SOLID-STATE HIGH MOLECULAR WEIGHT ELECTROLYTE TYPE FUEL CELL EMPLOYING THE ELECTRODE

(75) Inventor: Gang Xie, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 82 days.

(21) Appl. No.: 10/045,046

(22) Filed: Jan. 15, 2002

(65) Prior Publication Data

US 2002/0094472 A1 Jul. 18, 2002

(30) Foreign Application Priority Data

Jan. 15, 2001 (JP) ........................................ 2001-006811

(51) Int. Cl.[7] ................................................ H01M 4/88
(52) U.S. Cl. ............................ 429/42; 429/44; 502/101
(58) Field of Search ....................... 429/42, 44; 502/101

(56) References Cited

U.S. PATENT DOCUMENTS

| | | | | |
|---|---|---|---|---|
| 3,297,484 A | * | 1/1967 | Niedrach | ..................... 429/41 |
| 4,876,115 A | * | 10/1989 | Raistrick | ................... 429/42 X |
| 6,054,230 A | * | 4/2000 | Kato | ......................... 429/44 X |
| 6,309,772 B1 | * | 10/2001 | Zuber et al | ............... 429/42 X |
| 2002/0004159 A1 | * | 1/2002 | Totsuka | .................... 429/42 X |

FOREIGN PATENT DOCUMENTS

| | | | |
|---|---|---|---|
| JP | 06-020710 | * | 1/1994 |
| JP | 07-296818 | * | 11/1995 |
| JP | 08-185866 | | 7/1996 |

* cited by examiner

Primary Examiner—John S. Maples
(74) Attorney, Agent, or Firm—Oblon, Spivak, McClelland, Maier & Neustadt, P.C.

(57) ABSTRACT

In a fuel cell, the fuel cell electrode includes an electrode structure having electrical conductivity and gas permeability and a catalyst carried on the electrode structure in direct fashion. The fuel cell includes a high molecular weight electrolyte membrane held between a pair of the foregoing electrode structures to constitute an MEA and a pair of separators between which the MEA is sandwiched, such that at adjusting surface is formed between the MEA and each of the separators a gas passage. Thus, the fuel cell has less internal resistance and an excellent gas/water dispersion property.

4 Claims, 6 Drawing Sheets

ELECTRODE, METHOD OF PRODUCING THE SAME, AND SOLID-STATE HIGH MOLECULAR WEIGHT ELECTROLYTE TYPE FUEL CELL EMPLOYING THE ELECTRODE

The present application is based on, and claims priority under 35 U.S.C. § 119 with respect to, Japanese Patent Application No. 2000-006811 filed on Jan. 15, 2001 (13th year of Heisei), the entire content of which is incorporated herein by reference.

BACKGROUND OF THE INVENTION

1. Field of the Invention

The present invention is directed to an electrode, a method of producing the same and a solid-state high molecular weight electrolyte type fuel cell employing the electrode.

2. Description of the Related Art

Figure 5:
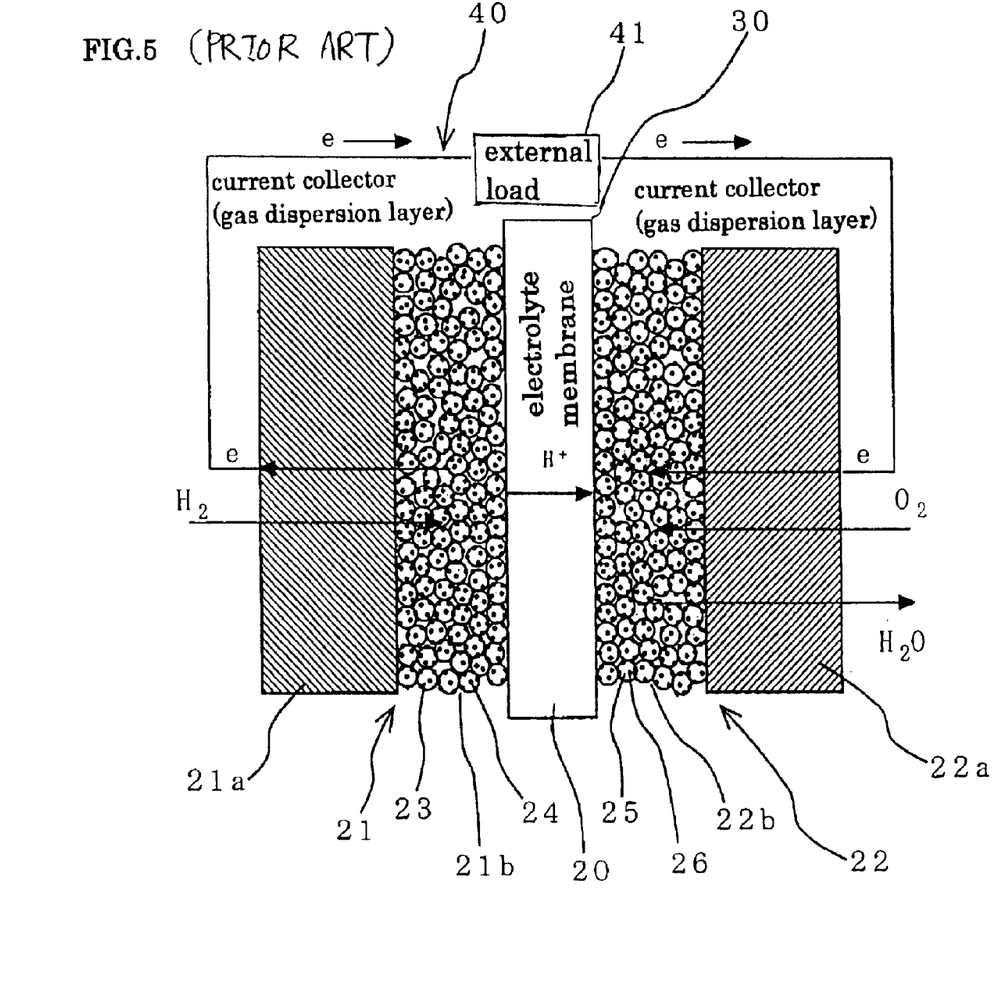
FIG. 5 is a cross-sectional view of a principal portion of a conventional solid-state high molecular weight electrolyte type fuel cell.
Figure 6:
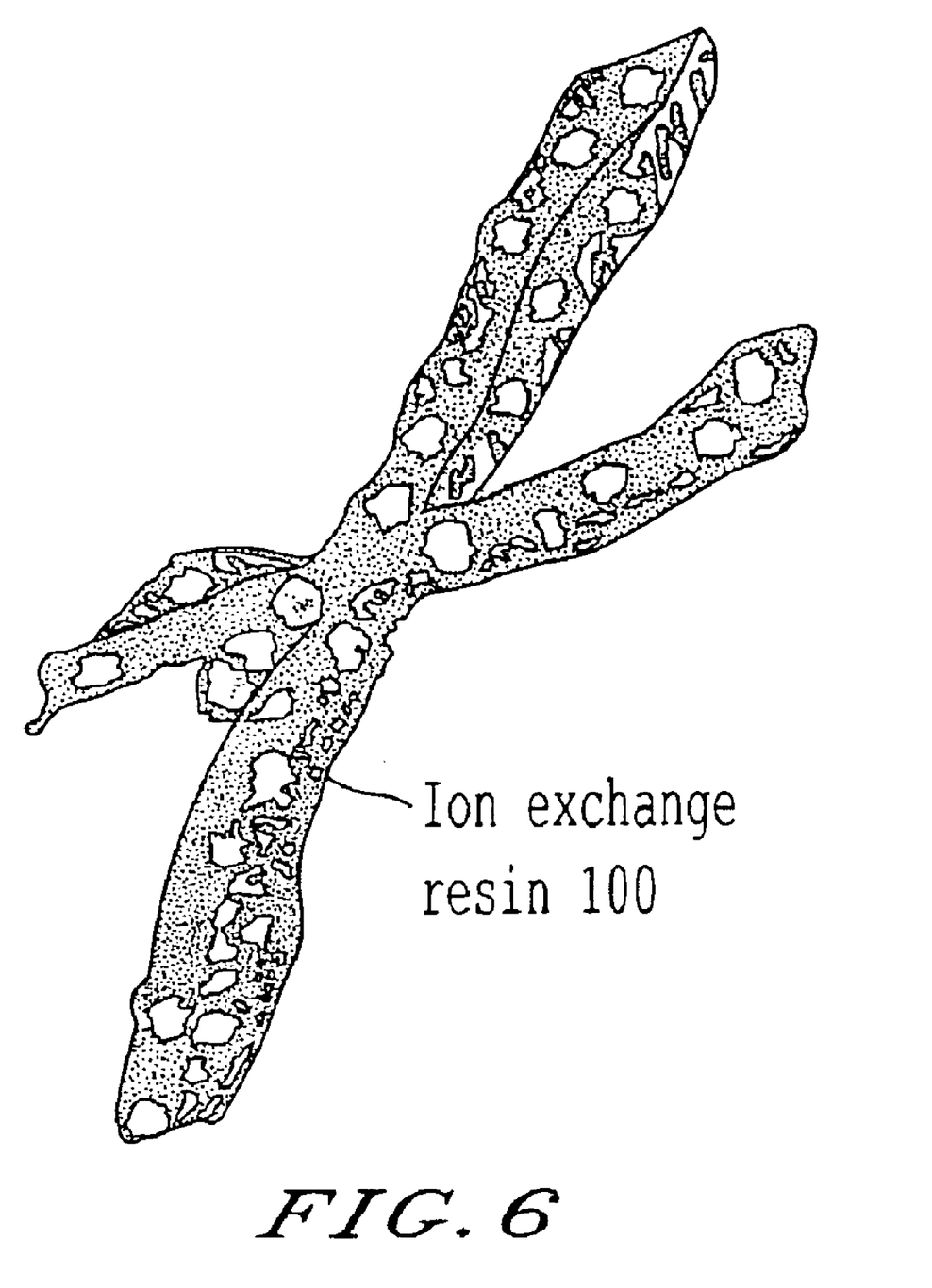
FIG. 6 is a detail illustrating the ion exchange resin.

Referring to FIG. 5, there is illustrated a cross-section of a conventional or well-known fuel cell of the solid-state high molecular weight electrolyte membrane type. In such a fuel cell, a solid-state high molecular weight electrolyte membrane 20 is sandwiched or interposed between a pair of fuel cell electrodes, fuel electrode 21 and oxygen electrode 22, to constitute a membrane electrode assembly 30 which will be hereinafter abbreviated to "MEA." The MEA 30 is held between a pair of separators (neither is shown). At an interface between each of the separators and its corresponding electrode, the fuel electrode and the oxygen electrode are formed with a fuel gas passage and an oxidizing gas passage, respectively.

The fuel electrode 21 and the oxygen electrode 22 are produced by providing catalyst layers 21b and 22b on surfaces of electrode structures 21a and 22a, respectively. The pair of fuel electrode 21 and oxygen electrode 22 hold or sandwich therebetween the membrane 20 so as to establish close or intimate contact of the respective catalyst layers 21b and 22b with the membrane 20. Each of the electrode structures 21a and 22a is electrically conductive and gas permeable. Each of the electrode structures 21a and 22a acts as both a gas dispersion layer and a current collector. One of the gas dispersion layers is for flowing the gas from one of the electrodes to the catalyst layer 21b, while the other of the gas dispersion layers is for flowing the gas from the other of the electrodes to the catalyst layer 22b. The current collector passes electrons therethrough.

The gas supplied to the fuel electrode 21 moves to the catalyst layer 21b through the electrode structure 21a to produce the following reaction.

$$2H_2 \rightarrow 4H^+ + 4e^-$$

The resultant hydrogen ions ($4H^+$) pass through the membrane 20 to reach the oxygen electrode 22. Concurrently, the electrons ($4e^-$) produced at the catalyst layer 21b by the foregoing reaction arrive at the catalyst layer 22b of the oxygen electrode 22 by way of the catalyst layer 21b, the electrode structure 21a and an external circuit 40 including an external load 41.

On the other hand, at the oxygen electrode 22, the oxidizing gas reaches the catalyst layer 22b after passing through the electrode structure 22. The oxygen in the oxidizing gas is deoxidized by coupling with the electrons ($4e^-$) and is coupled with hydrogen ions ($4H^+$) which come from the fuel electrode 21 through the membrane 20, as apparent from the following reaction.

$$O_2 + 4H^+ + 4e^- \rightarrow 2H_2O$$

Some of the resultant water enters the membrane 20, due to the concentration gradient, to move toward the fuel electrode 21 in a dispersed fashion, while the remaining water is changed into its gas phase or vapor, to be discharged together with an off-gas of the oxidizing gas after being dispersed to the gas passage by way of the catalyst layer 22b and the electrode structure 22a. Thus, the fuel cell functions as a battery since it produces electrons to generate an electric current.

As described above in great detail, the conventional fuel cell is constructed such that the catalyst layer is provided on each surface of the electrode structure, which acts as both the gas dispersion layer and the current collector.

However, the conventional fuel cell has problems or drawbacks in that the catalyst utilization rate is low, the internal resistance is large, and the gas and produced water dispersions are subject to be in a velocity controlling step. Thus, the output characteristic of the conventional fuel cell remains insufficient.

SUMMARY OF THE INVENTION

The present invention has been developed in view of the aforementioned circumstances. In detail, it has been recognized that in the fuel cell, the electric resistances of the respective electrode structure and catalyst layer constitute its internal resistance, which causes an output of the fuel cell to drop. The conventional fuel electrode/oxygen electrode is formed by providing a catalyst layer onto a surface of the electrode structure in such a manner that carbon particles which are previously applied with platinum catalysts are added to an ion exchange resin solution and a dispersing agent, the resultant mixture is kneaded thoroughly to prepare a paste, the resultant catalyst paste is applied evenly onto the surface of the electrode structure which has been provided with a water repellent finish, and the paste applied surface is dried.

The present invention is based on a recognition that the mixing of the ion exchange resin into the catalyst paste causes a poor contact between the platinum carrying carbon particles and/or an isolation of each of the platinum carrying carbon particles by being surrounded by the ion exchange resin. It is well known that the electrochemical reaction at the electrode in the fuel cell requires the formation of a three-phase boundary face by the catalyst, the gas (hydrogen or oxygen), and the ion exchange resin solution. Thus, since each of the platinum carrying carbon particles is perfectly surrounded by or covered with the ion exchange resin, the catalyst is prevented from being in contact with the gas, which inhibits formation of a three phase boundary face. The result is that at such portions no electrical chemical reactions occur, whereby the catalyst utilization rate at the catalyst layer becomes lower and the fuel cell output is lowered.

The contribution of the catalyst to the electrical chemical reaction becomes effective only when an electronic conductive network is established between the catalysts and/or between the catalyst and the current collector, and an ion conductive network is established between the catalyst and the electrolyte membrane. In the catalyst layer, its electronic conductivity is established by mutual contact between the platinum carrying carbon particles, and such contact is reduced due to the existence of the ion exchange resin therebetween, which causes the electric resistance of the catalyst layer to increase.

According to the present invention, the catalyst is caused to be carried or provided directly on an electrode structure which is electrically conductive and gas permeable, resulting from preventing an ion exchange resin from entering between the catalysts and/or between the catalyst and the current collector which is established by an integration of the current collector, a gas dispersion layer and the catalyst layer. Thus, there is provided a solid-state high molecular weight electrolyte type fuel cell electrode which is excellent in catalyst utilizing rate, electric conductivity and gas permeability.

A first aspect of the present invention is to provide an electrode for fuel cells which comprises an electrode structure which is electrically conductive and gas permeable, and a catalyst directly carried on the electrode structure.

In accordance with the first aspect of the present invention, the direct contact of the catalyst onto the electrode structure causes the catalyst to directly contact the electrode structure which acts as a current collector, without interposing an ion exchange resin, whereby the catalyst effectively contributes to the electrochemical reaction, resulting in increasing the catalyst utilization rate. In addition, the direct contact between the catalyst and the electrode structure makes the fuel cell electrode excellent in electric conductivity. Moreover, due to the fact that the construction of the electrode structure ensures good gas and water dispersion properties, the fuel cell electrode becomes excellent in gas and water dispersion.

A second aspect of the present invention is to provide an electrode formed of electrically conductive fiber filaments. In accordance with the second aspect of the present invention, the fuel cell electrode has sufficient strength and electrical conductivity.

A third aspect of the present invention is to provide an electrode formed of electrically conductive fiber filaments which are dispersed therein with electrically conductive particles. In accordance with the third aspect of the present invention, the fuel cell electrode can be made adequate in electrical conductivity and gas permeability.

A fourth aspect of the present invention is to provide an electrode wherein the electrically conductive fiber element is an active carbon fiber filament.

In accordance with the fourth aspect of the present invention, employing the active carbon fiber filaments which are large in specific surface area makes it possible to apply the catalyst in a highly dispersed mode, thereby making the fuel cell electrode excellent in catalyst activity. Furthermore, the catalyst dispersion and the formation of the electrode structure are established in a common process, which makes it possible to overcome the conventional problem of lowering the catalyst utilization in the electrode forming process due to the condensed catalyst application, even if a highly-dispersed catalyst carrying carbon is used, resulting in making the fuel cell electrode excellent in catalyst activity.

A fifth aspect of the present invention is to provide an electrode formed of either of a sinter of electrically conductive particles and an electrically conductive porous material. In accordance with the fifth aspect of the present invention, the fuel cell electrode has sufficient strength and electrical conductivity.

A sixth aspect of the present invention is to provide a method of producing an electrode for fuel cells which comprises a water repellant treating process for establishing a water repellent finish state of an electrically conductive and water repellant electrode structure; carrying a catalyst on the water repellent finished electrode structure; and applying ion exchange resin onto the catalyst carrying electrode structure.

In accordance with the sixth aspect of the present invention, the ion exchange resin is applied onto the electrode structure which has been carried with the catalyst. Thus, the direct contact of the catalyst onto the electrode structure causes the catalyst to contact directly with the electrode structure which acts as a current collector without interposition of an ion exchange resin, whereby the catalyst contributes to the electrochemical reaction effectively, resulting in increasing the catalyst utilization rate. In addition, the direct contact between the catalyst and the electrode structure makes the fuel cell electrode excellent in electric conductivity. Moreover, due to the fact that the construction of the electrode structure ensures good gas and water dispersion properties, the fuel cell electrode becomes excellent in gas and water dispersion.

In a seventh aspect of the present invention, the electrode structure is formed of electrically conductive fiber filaments which are dispersed therein with electrically conductive particles. In accordance with the seventh aspect of the present invention, the produced fuel cell electrode can be made adequate in electrical conductivity and gas permeability.

In an eighth aspect of the present invention, a solid-state high molecular weight electrolyte type fuel cell comprises a pair of electrodes, each having a solid-state high molecular weight electrolyte membrane sandwiched between the pair of the electrodes to constitute a membrane electrode assembly; and a pair of separators sandwiching therebetween the membrane electrode assembly, each of the separators being in contact with the corresponding electrode to define a gas passage therebetween.

In the eighth aspect of the present invention, employing the electrode which is excellent in catalyst utilization rate, electrical conductivity, and gas/water dispersion property makes it possible to make the solid-state high molecular weight electrolyte type fuel cell superior in output.

BRIEF DESCRIPTION OF THE DRAWINGS

The above and other objects, features and advantages of the present invention will be more apparent and more readily appreciated from the following detailed description of a preferred exemplary embodiment of the present invention, taken in connection with the accompanying drawings, in which;

FIGS. 1(*a*)–1(*c*) illustrate how a first embodiment is produced wherein FIGS. 1(*a*), 1(*b*) and 1(*c*) respectively denote an original electrode structure, a water-repellent finished electrode structure and an electrode structure according to the first embodiment;

DETAILED DESCRIPTION OF THE PREFERRED EMBODIMENTS

Hereinafter, embodiments of the present invention will be described in detail.

[First Embodiment]

Figure 1:
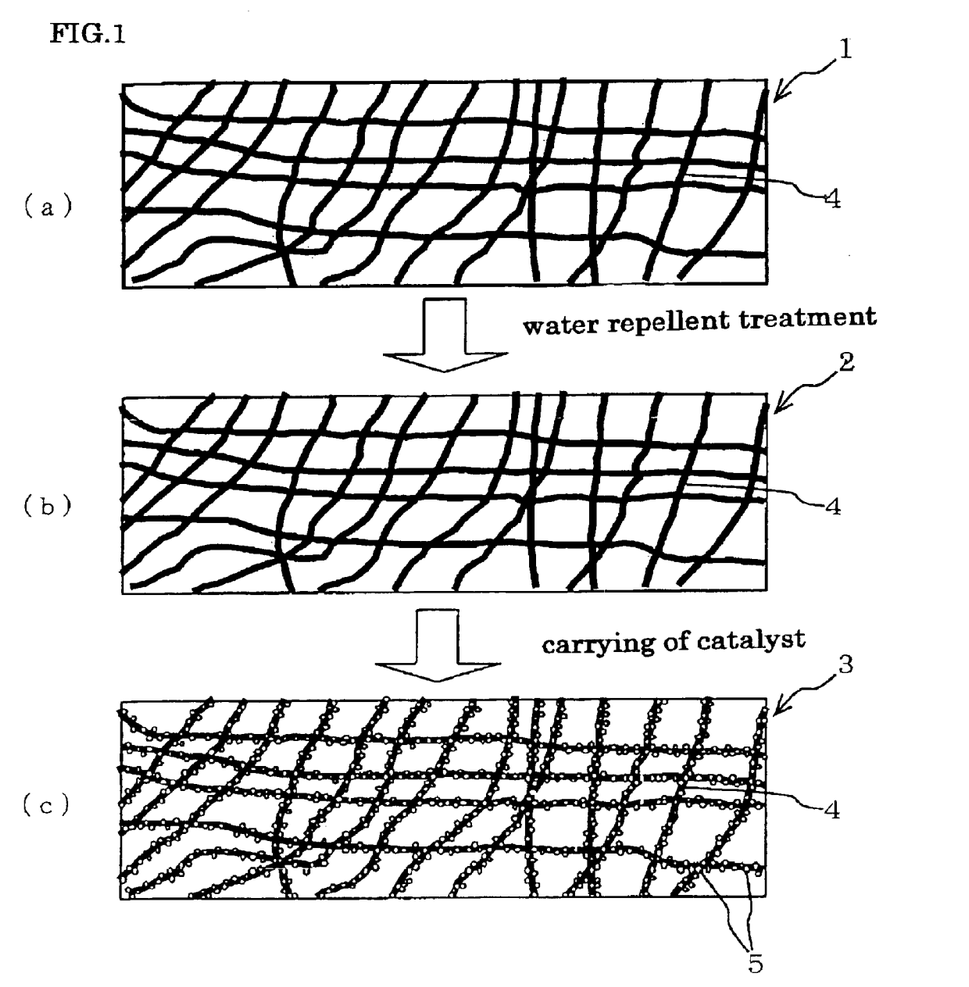

First of all, referring to FIGS. 1(a) to 1(c), there is illustrated a sequential diagram of how a first embodiment is produced, wherein FIGS. 1(a), 1(b), and 1(c) respectively denote a an original electrode structure 1, a water-repellent finished electrode structure 2, and an electrode structure 3 according to the first embodiment. The original electrode structure 1 is in the form of a carbon fiber sheet 3 which is formed of a multiplicity of active carbon fiber filaments 4.

Each of the carbon fiber filaments 4 is electrically conductive, which makes the carbon fiber sheet 1 electrically conductive. The carbon fiber sheet 1 may be the product provided by Nippon Kynol under the trade name of ACC-507-15. The carbon fiber sheet 1 has a thickness of about 500 $\mu m$ and a weight of 120 g/cm$^2$. The carbon fiber filaments 4 which constitute the carbon fiber sheet 1 include numerous micro pores at their outer surfaces and are very large in specific surface area. The specific surface area of the active carbon filaments range in general from 100 to 3000 m$^2$/g, and in the present embodiment a specific surface area of 1500 m$^2$/g is employed.

A PTFE particle dispersed dilute solution is prepared, and is formed by diluting a PTFE particle liquid with an amount of water such that the consistency of the PTFE particles becomes 15 weight percent. It is to be noted that the PTFE particle dispersed liquid contains PTFE particles at 60 weight % and is provided by Daikin Kogyo Co. Ltd. under the trade name of POLYFLON whose grade is D-1. The aforementioned porous electrode substrate sheet 1, i.e., the carbon fiber sheet 1 formed of active carbon fiber filaments 4, is immersed in the dilute solution in order to absorb the PTFE particles dispersed in the dilute solution, to impregnate the sheet 1. Next, the resultant electrode substrate sheet is dried by placing the same in ambient air at 80 C to evaporate the water. Thereafter, the resultant electrode substrate sheet is held in ambient at 390 C for 60 minutes, whereby the PTFE particles are fixed on the surface of the carbon fiber filaments to obtain the water repellent finished carbon sheet 2.

Next, a solution of dinitritodiamin platinum nitrate (which contains 8 weight % of platinum) is prepared. Then, the aforementioned water repellent, finished carbon sheet 2 is immersed in this solution for a time duration of 30 minutes. Thereafter, the water repellent finished carbon sheet 2 is removed from the solution, to dry its outer surface, as it is, in room temperature for a time duration of 30 minutes and is heat treated at a temperature of 200 C for 30 minutes. The immersion, drying, and heat treatment are repeated until the net carrying amount of the platinum becomes 0.2 mg per unit area (cm$^2$), thereby obtaining a platinum carrying carbon sheet.

Thereafter, the platinum carrying carbon sheet is immersed for a time duration of 5 minutes in an ion exchange resin solution of 5% consistency which is provided by Asahi Kasei Co. Ltd. under the trade name of Ashiplex SS-1080 and is removed therefrom to dry at room temperature, whereby the electrode 3 for fuel cells is obtained. This electrode is available as an oxygen electrode 14 or a fuel electrode 15 (cf. FIG. 2). Platinum particles 5, which act as a catalyst, are directly carried on each of the active carbon fiber filaments 4 and such active carbon fiber filaments 4 are covered with the ion exchange resin 100.

Figure 2:
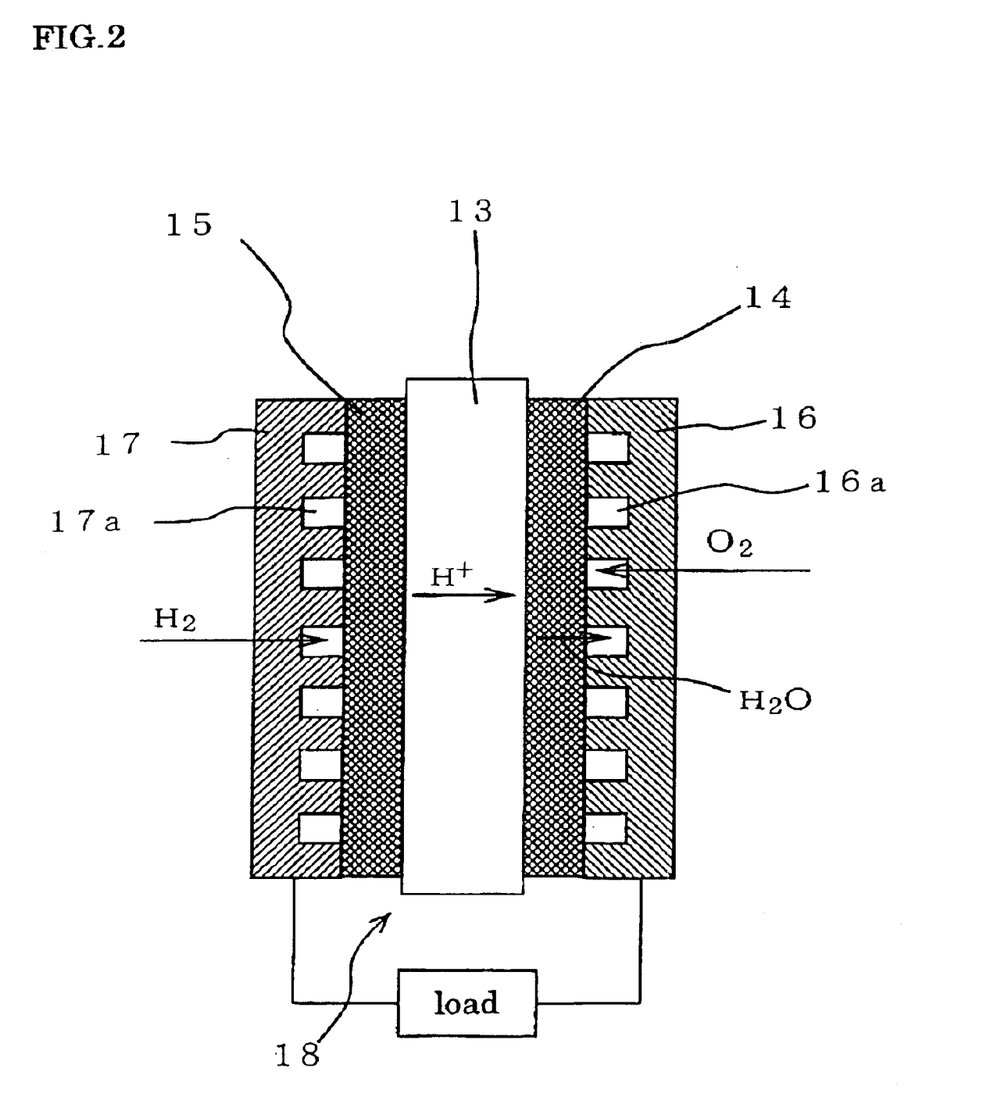
FIG. 2 is a cross-sectional view of a fuel cell according to the first embodiment of the present invention FIGS. 3(*a*)–3(*d*) illustrate how a second embodiment is produced wherein FIGS. 3(*a*), 3(*b*), 3(*c*) and 3(*d*) respectively denote a carbon cloth formed of active carbon fibers, an original electrode structure, a water-repellent finished electrode structure, and an electrode structure according to the second embodiment.
Figure 3:
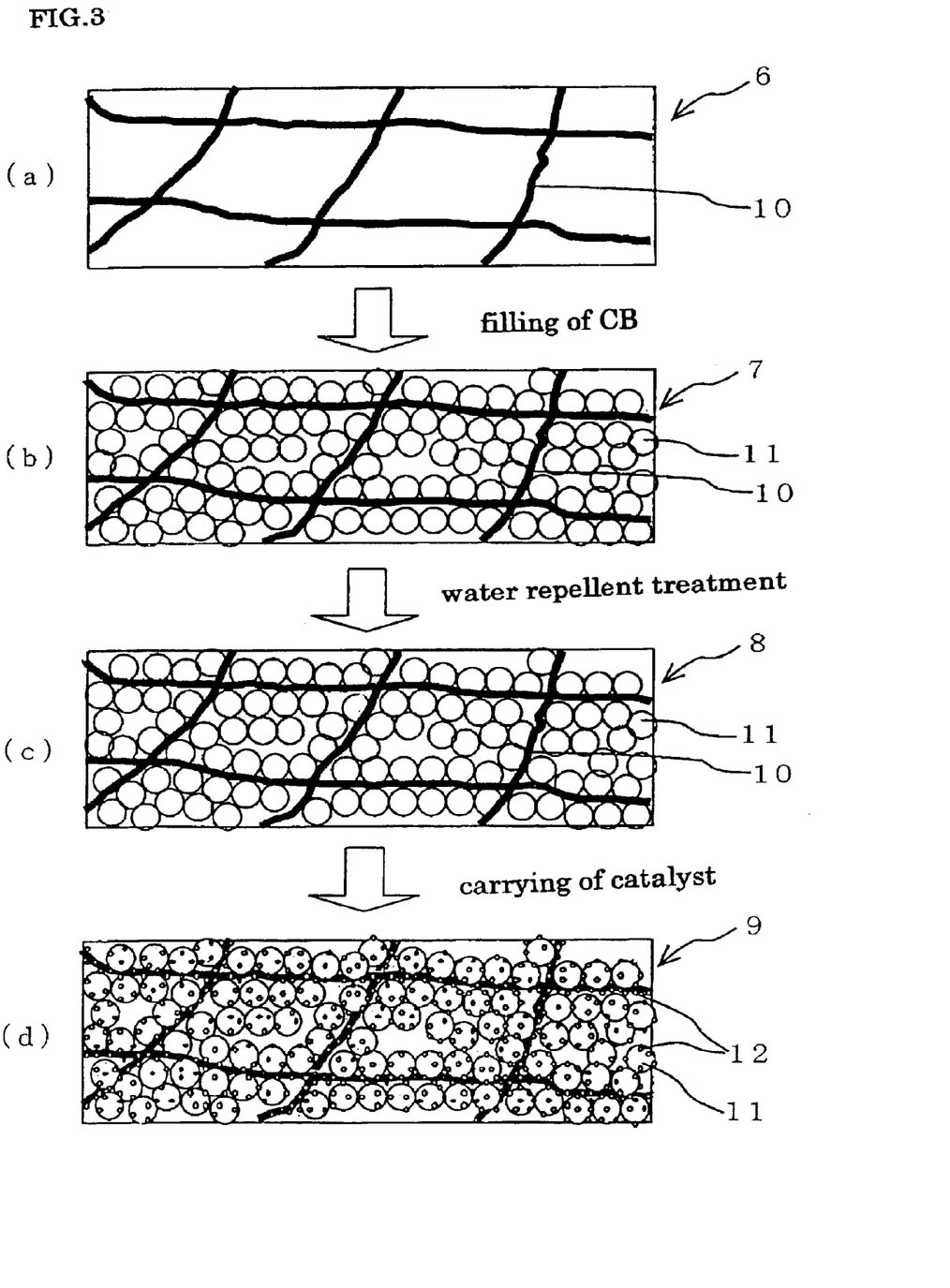

Referring next to FIG. 2, there is illustrated a cross-section of a single cell of a solid high molecular weight electrolyte type fuel cell. In this single cell, as a raw material of a solid-state high molecular weight electrolyte membrane 13, Nafion112 (trade name) is employed which is provided by Dupont. A membrane electrode assembly 18 is produced such that the membrane 13, while it is being held between the oxygen electrode 14 and the fuel electrode 15, is brought into a hot-press state for a time duration of one minute at conditions of 120 C and 2 Mpa. The resultant stack cell is held between separators 16 and 17 to constitute the single cell. The separator 16 is provided therein with a flow passage 16a through which an oxidizing gas flows, while the separator 17 is provided therein with a flow passage 17a through which a fuel gas flows.

An electricity generation experiment was conducted to evaluate an output characteristic of the resultant solid-state high molecular weight electrolyte type fuel cell stack. The test conditions were a cell temperature of 80 C, air (utilization rate: 40%) as the oxidizing gas supplied at 0.25 Mpa to the flow passage 16a, and hydrogen (utilization rate: 80%) as the fuel gas supplied to the flow passage 17. At this stage, an amount of water which is in gas phase, i.e., water vapor, was added, for wetting, to the oxidizing gas at a mole ratio of 0.04 relative to the amount of the air, while an amount of water which is in gas phase, i.e., water vapor, was added, for wetting, to the fuel gas at a mole ratio of 0.04 relative to the amount of pure hydrogen.

[Second Embodiment]

Referring now to FIGS. 3(a)–3(d), there is depicted a sequential diagram of how a second embodiment is produced wherein FIGS. 3(a), 3(b), 3(c) and 3(d) respectively denote a carbon cloth formed of active carbon fibers, an original electrode structure, a water-repellent finished electrode structure and an electrode structure according to the second embodiment. The electrode structure 7 is produced by using the carbon fiber sheet 6 which is formed of a multiplicity of active carbon fiber filaments 10. The carbon fiber sheet 6 is identical with that of the first embodiment. It is to be noted that the gap between two adjacent fiber filaments in FIG. 3 looks larger than that in FIG. 2 due to a difference in scaling ratio.

As electrically conductive particles, a carbon black powder (having an average particle diameter of 40 nm), which is sold by Cabot Japan Company, may be used. The carbon black powder, which includes a multiplicity of particles 11, is mixed thoroughly with an amount of ethylene-glycol and an amount of IPA, both of which are used as forming promoters, at a weight ratio of 1:10:1.8, and the resulting mixture is stirred, thereby producing a carbon black paste. The carbon black paste is screen printed on the carbon fiber sheet to impregnate the paste therein, and the resulting sheet is dried to produce a membrane electrode assembly (MEA).

The aforementioned membrane electrode assembly 7 is immersed in a dispersion solution whose composition is identical with the dispersion solution composition in the first embodiment. Thereafter, the membrane electrode assembly 7 is placed for being dried within a vacuum at 80 C. for a time duration of 2 hours to evaporate the solution. The resulting membrane electrode assembly 7 is held for PTFE baking in ambient air at 390 C for 60 minutes, thereby producing a water repellent finished membrane electrode assembly 8.

Next, like the first embodiment, the water repellent finished membrane electrode assembly 8 is, after being applied with a platinum catalyst at 0.2 mg per unit area (cm$^2$), immersed in an ion exchange solution to produce an electrode 9 for fuel cells. Particles 12 of the platinum catalyst are directly carried or fixed on each of the active carbon fiber filaments 10 and each of the carbon black particles 11. Each of the resulting active carbon fiber filaments 10, and each of the resulting carbon black particles 11, is respectively covered with ion exchange resins.

The thus obtained electrode 9 for fuel cells is used to constitute the oxygen electrode 14 and the fuel electrode 15 in order to produce a single cell of a solid-state high molecular weight electrolyte type fuel cell, similar to the first embodiment. The resulting single cell was evaluated like the first embodiment.

COMPARATIVE EXAMPLE

As a raw material of a comparative electrode structure, a carbon paper having a thickness of 180 $\mu$m which is provided by Toray Co. Ltd. under the trade name of Torayca TGP-060, was provided. Like the first embodiment, the carbon paper was immersed in a dispersion solution whose composition was identical with the dispersion solution composition in the first embodiment. Thereafter, the carbon paper was placed for being dried in a vacuum at a temperature of 80 C for 2 hours and then was brought into water-repellent treatment such that the carbon paper was held for PTFE baking in ambient air of 390 C for 60 minutes.

A catalyst paste was produced by mixing thoroughly 12 g of platinum carrying carbon whose platinum carrying consistency was 40 wt % and which is provided by Johnson Massy Co. Ltd. under the trade name of HiSPEC4000, 180 g of ion exchange resin solution whose consistency was 5 wt % and which is provided by Asahi Kasei under the trade name of SS-1080, 22.8 g of water, and 22.8 g of isopropyl-alcohol as a forming promoter. The resulting catalyst paste was applied onto the aforementioned water-repellent finished carbon paper, through Dr. Braid Method, to form a catalyst layer such that the platinum carrying amount becomes 0.2 mg per unit area ($cm^2$). Then, the resulting paper was dried to produce a comparative electrode for fuel cells. The thus produced electrode was used as oxidizing and fuel electrodes to constitute a comparative solid-state high molecular weight electrolyte type single fuel cell which was similar to the first embodiment. The comparative solid-state high molecular weight electrolyte type single fuel cell was evaluated in a manner similar to the evaluation of the first embodiment.

Evaluation Results

Figure 4:
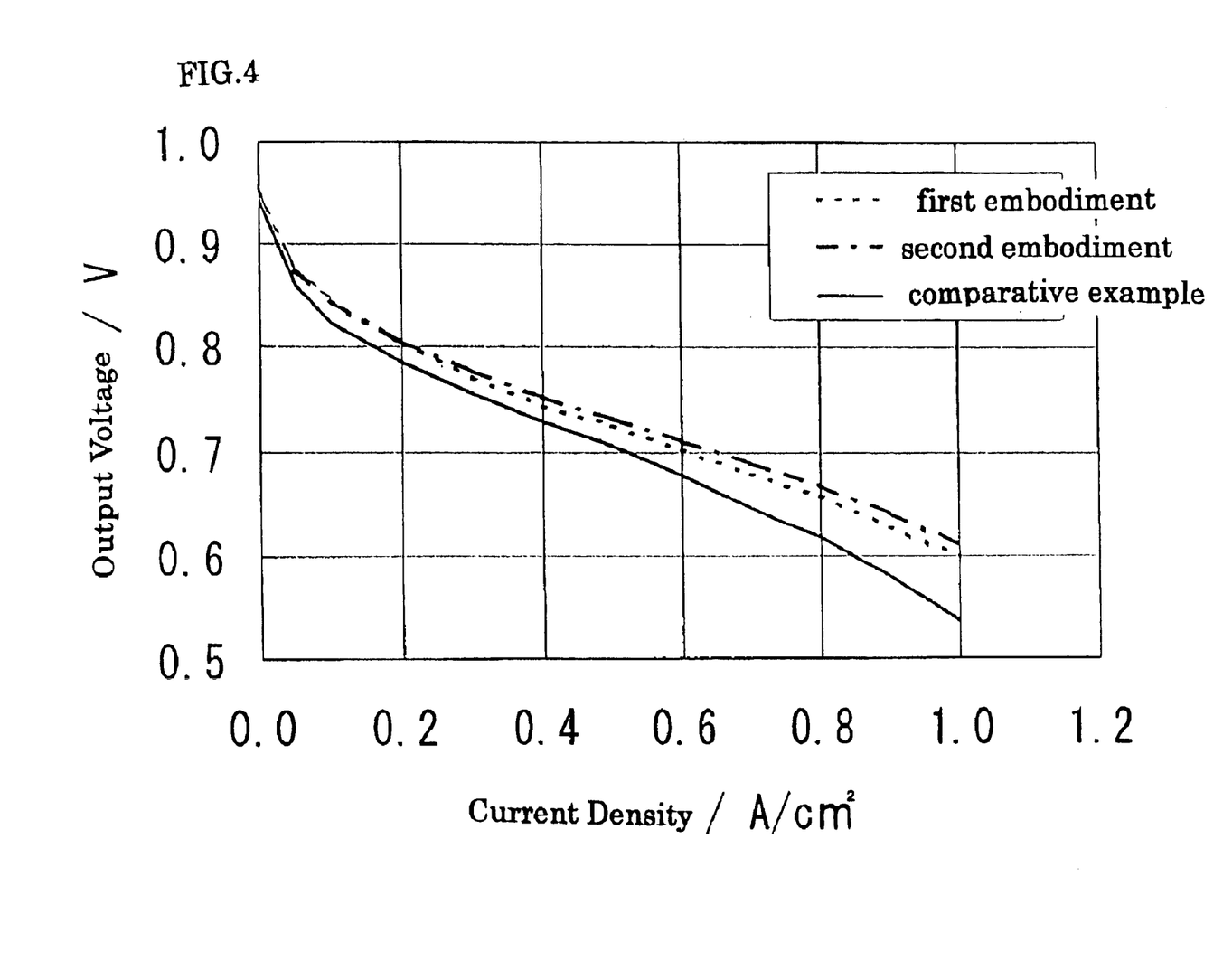
FIG. 4 is a graph indicating output characteristics of the first embodiment, the second embodiment, and a comparative example, respectively.

Referring to FIG. 4, there is illustrated a graph which is indicative of the output characteristics of the first embodiment, the second embodiment and the comparative example, respectively. This graph reveals that each of the first embodiment and the second embodiment provides higher output voltages than the comparative example, irrespective of current density.

In each of the embodiments, the electrode structure is, after being applied with the catalyst, applied with the ion exchange resin coating treatment, which makes it possible to establish a direct contact between the electrode structure and the catalyst, without interposing the ion exchange resin therebetween. Thus, between the electrode structure which acts as a current collector and the catalyst, a network can be constituted which is excellent or superior in electrical conductivity, which causes the catalyst to promote the electrochemical reaction effectively, thereby improving the catalyst utilization rate.

In addition, the electrode structure is brought into direct contact with the catalyst, which makes it possible to make the fuel cell excellent in electric conductivity. Moreover, employing the active carbon fiber filaments which are large in specific surface area makes it possible to effectively disperse the catalyst on the electrode structure, resulting in the fuel cell electrode structure being excellent in catalyst activity. Furthermore, the catalyst dispersion and the formation of the electrode structure are established in a common process, which makes it possible to overcome the conventional problem of lowering the catalyst utilization in the electrode forming process due to condensation of the catalyst application, even if the highly-dispersed catalyst carrying carbon is used, also resulting in making the fuel cell electrode excellent in catalyst activity.

Further, the construction of the electrode structure is capable of ensuring the dispersion properties in gas and water, which makes it possible to provide a fuel cell electrode which is excellent in gas and water dispersion properties by selecting the electrode structure which is suitable in gas permeability and electric conductivity.

Due to the fact that the fuel cell is produced by employing an electrode which is excellent in catalyst utilization rate, electric conductivity, and gas/water permeability, the output characteristic of the fuel cell can be remarkably improved.

As is disclosed in the second embodiment, when the electrode structure is formed by dispersing the electrically conductive particles in the conductive fiber filaments, the gas permeability of the electrode structure can be controlled by adjusting at least any one of the gap rate of the conductive fiber filaments, the particle diameter of the electrically conductive particle, and the amount thereof. In the same way, the electrical conductivity of the electrode structure can be controlled. Such adjustments make it possible to make the fuel cell electrode suitable or pertinent in electric conductivity and gas permeability.

In the aforementioned embodiments, forming the electrode structure of the electrically conductive fiber filaments is an example, but the invention is not limited thereto. Alternatively, other substances are available which are both electrically conductive and gas permeable such as powder of sinter of electrically conductive particles, porous medium, and a complex of these materials. However, employing the electrically conductive fiber filaments permits the electrode structure to have both sufficient strength and electric conductivity. Of course, employment of any one of a sinter of electrically conductive particles, porous medium and a complex of these materials makes it possible to make the resulting electrode structure to have both sufficient strength and electric conductivity.

In the embodiments, as the electrically conductive fiber filaments and the active carbon fiber filaments are employed as being exemplary and are not restrictive. Any other fibers are available, subject to their having electrical conductivity. Due to their large specific surface area, the active carbon fiber filaments can carry thereon the catalyst in a highly dispersed mode, whereby the fuel cell electrode can be excellent in catalyst activity.

Advantages

As described above in great detail, the present invention provides a fuel cell electrode and a fuel cell, the fuel cell including an electrode structure having electrical conductivity and gas permeability and a catalyst carried on the electrode structure in direct fashion, the fuel cell including a high molecular weight electrolyte membrane held between a pair of the foregoing electrode structures to constitute an MEA and a pair of separators between which the MEA is sandwiched, such that at adjusting surface between the MEA and each of the separators a gas passage is formed. Thus, the fuel cell in accordance with the present invention has less internal resistance and has an excellent gas/water dispersion property.

The invention has thus been shown and description with reference to specific embodiments, however, it should be understood that the invention is in no way limited to the details of the illustrated structures but changes and modifications may be made without departing from the scope of the appended claims.

What is claimed is:

1. A method of producing an electrode for fuel cells comprising the steps of:

establishing a water repellent finished state of an electrode structure which is electrically conductive and gas permeable;

carrying a catalyst on the water repellent finished electrode structure; and substantially covering the catalyst carrying electrode structure with ion exchange resin.

2. A method as set forth in claim 1, wherein the electrode structure is formed of electrically conductive fiber filaments having electrically conductive particles dispersed thereon.

3. A method of producing an electrode for fuel cells, comprising the sequential steps of:

establishing water repellent finished state of an electrode structure which is electrically conductive, and gas permeable;

carrying a catalyst on the water repellent finished electrode structure; and substantially covering the electrode structure with ion exchange resin.

4. A method as set forth in claim 1, wherein the water repellent finished state of the electrode is immersed in a solution including the catalyst in the carrying step of the catalyst.

* * * * *